United States Patent [19]
Fahey

[11] 3,853,605
[45] Dec. 10, 1974

[54] PROCESS FOR APPLYING A COATING COMPOSITION TO GLASS FIBERS AND THE RESULTING COATED FIBERS

[75] Inventor: Dennis M. Fahey, Aspinwall, Pa.

[73] Assignee: PPG Industries, Inc., Pittsburgh, Pa.

[22] Filed: Jan. 26, 1973

[21] Appl. No.: 326,650

Related U.S. Application Data

[63] Continuation of Ser. No. 93,939, Dec. 1, 1970, abandoned.

[52] U.S. Cl. .............. 117/126 GB, 65/3, 117/72, 117/126 GN, 260/29.3, 260/845, 260/846
[51] Int. Cl... B32b 17/06, B32d 17/10, C03c 25/02
[58] Field of Search................... 260/845, 846, 29.3; 117/126 GN, 126 GB, 72; 65/3

[56] References Cited
UNITED STATES PATENTS

| | | | |
|---|---|---|---|
| 3,345,206 | 10/1967 | Korpman | 260/845 |
| 3,455,859 | 7/1969 | Korpman | 260/845 |
| 3,475,362 | 10/1969 | Romanick | 260/845 |
| 3,537,882 | 11/1970 | Wiggill | 117/126 GB |
| 3,567,671 | 3/1971 | Janetos et al. | 260/846 |
| 3,620,701 | 11/1971 | Janetos et al. | 117/72 |
| 3,661,628 | 5/1972 | Marsden | 117/72 |
| 3,705,073 | 12/1972 | Marzocchi | 260/29.3 |
| 3,718,448 | 2/1973 | Drummond | 65/3 |

*Primary Examiner*—William D. Martin
*Assistant Examiner*—William H. Schmidt
*Attorney, Agent, or Firm*—Robert DeMajistre; John E. Curley

[57] ABSTRACT

Individual glass fibers are coated with a combined aqueous sizing and coating composition that includes a resorcinol-formaldehyde resin solution admixed with a styrenebutadiene-vinylpyridine terpolymer latex. A coupling agent containing a hydrolizable aminofunctional silane, ammonia and an ammonia soluble carboxyl-containing polymer is admixed with the resin and latex to form an aqueous combined sizing and coating composition. The individual glass fibers are coated shortly after attenuation and thereafter are gathered into strands. The strands are dried while spaced from each other and then collected on a forming tube. The coated strands are used as glass fiber reinforcement for elastomeric products. The presence of the ammonia-soluble carboxylcontaining polymer in the coupling agent stabilizes the coupling agent so that the coupling agent does not cause precipitation of the resin-latex mixture when admixed therewith. The resin, latex and coupling agent can be applied as a combined sizing and coating in a one step coating process.

3 Claims, 3 Drawing Figures

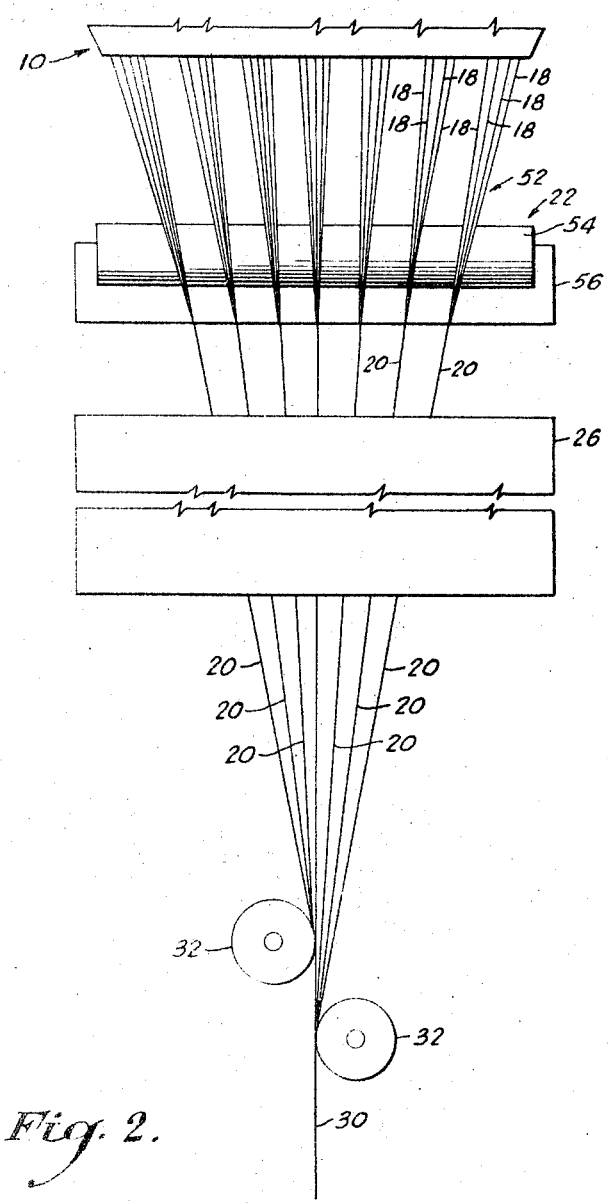
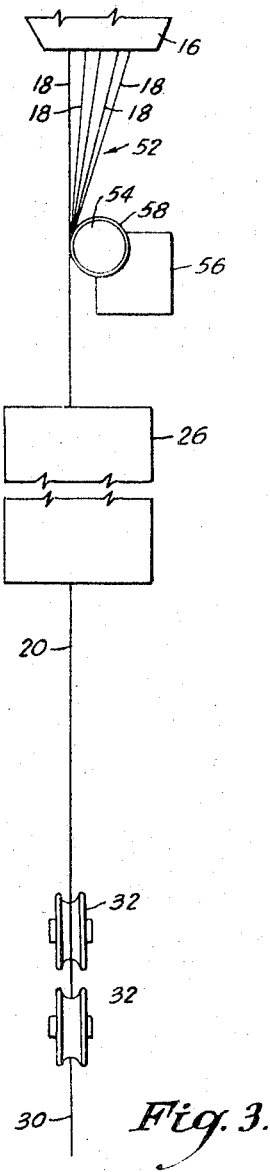
Fig. 2.
Fig. 3.

3,853,605

PROCESS FOR APPLYING A COATING COMPOSITION TO GLASS FIBERS AND THE RESULTING COATED FIBERS

This is a continuation of application Ser. No. 93,939, filed Dec. 1, 1970, now abandoned.

BACKGROUND OF THE INVENTION

1. Field of the Invention

This invention relates to a combined sizing and coating composition for glass fibers and more particularly, to a stabilized combined aqueous sizing and coating composition for simultaneously sizing and coating glass fibers for use in reinforcing elastomeric products and the process for preparing and applying the coating composition to glass fibers.

2. Description of the Prior Art

A glass fiber strand is composed of a multitude of fine glass fibers which are formed by being drawn at a high rate of speed from molten cones of glass located at the tips of small orifices in a bushing such as shown in U.S. Pat. No. 3,122,238. During formation, the fibers are coated while moving at a high speed, with a sizing composition. The sizing composition is an aqueous composition which usually contains a binder to give the strand integrity for workability during twisting, plying, weaving, and the like. Where the glass-fiber strands, yarn, or fabric formed therefrom, are used as a reinforcement for resinous or elastomeric materials, the sizing composition usually contains a coupling agent or finish material, which makes the surface of the glass fibers hydrophobic or compatible with the particular material with which they are to be employed in preparing reinforced resinous and elastomeric products.

Where glass fibers are used for preparing glass fiber reinforced elastomeric products, an additional coating containing a rubber adhesive, is applied in a subsequent process step to the glass fiber material having been previously coated with a sizing composition containing a coupling agent. By far, the most widely used rubber adhesive in the industry is the resorcinol-formaldehyde resin, usually in combination with a vinylpyridine polymer or terpolymer latex. U.S. Pat. No. 2,817,616 discloses the above rubber adhesive for use with rubber reinforcing material such as natural textile materials as for example, cotton and cellulosic materials such as rayon, nylon and Dacron.

It has been desired to apply a combined sizing and coating composition to glass fibers for use in reinforcing rubber or rubber-like compositions in a one step process as distinguished from the conventional two step process where the sizing is applied first and thereafter, the coating is applied to the sized fibers. However, this has as yet been difficult to attain. One of the reasons preventing the combination of a sizing composition containing a coupling agent with a coating composition containing a rubber adhesive has been the general incompatibility with rubber adhesive coating compositions of the coupling agents employed in the sizing composition. For example, the addition of a typical amino-functional hydrolizable silane coupling agent with an aqueous coating composition containing resorcinol-formaldehyde resin and a vinylpyridine polymer of terpolymer latex often caused the entire batch to be "thrown out" of solution and form a massive unusable precipitate. One of the means for overcoming this problem was the addition of extensive quantities of water to the combined sizing and coating compositions. This, however, was not a satisfactory solution since it is necessary to obtain a rather high coating weight, e.g., about 15 to 20 percent minimum to about 25 to 30 percent by weight based on dry glass. Overdilution of the sizing and coating compositions with water prevented the attaining of the high coating weight and thereby necessitated the application of the composition in two or more "dips" or coating steps.

A copending application entitled, "Fiber Forming and Coating Process," filed on Apr. 9. 1969 by Warren W. Drummond and Donald W. Denniston, Ser. No. 814,731, now abandoned and assigned to the assignee of this invention, parent of continuation in part application of U.S. Application No. 214,748 filed Jan. 3, 1972, now U.S. Pat. No. 3,718,448, discloses apparatus for applying a combined sizing and coating composition to individual glass fibers and then drying the fibers in strands and collecting the dried strands on a forming tube. By this process, the glass fibers are simultaneously coated with both the sizing and coating in a single coating step that reduces substantially the time and equipment required to process the glass fibers for use as a reinforcement in elastomeric products. In large scale batches or where an excess of formaldehyde is used in the combined sizing and coating composition, difficulty has been encountered in preparing the aqueous solution of the resin, latex and coupling agent without causing precipitation of a substantial portion of the latex. There is a need, therefore, for a combined sizing and coating composition that may be prepared in large scale batches that remains stable while being prepared and applied to the glass fibers as a single coating.

SUMMARY OF THE INVENTION

This invention is directed to a process for coating glass fibers for use in reinforcing elastomeric products. The glass fibers are coated with a novel combined sizing and coating composition which includes an aqueous mixture of a resorcinol-formaldehyde resin, a styrene-butadiene-vinylpyridine terpolymer latex, an amino silane coupling agent, ammonia and an ammonia-soluble, carboxyl-containing polymer stabilizing agent. The coated fibers are combined into a plurality of spaced strands and dried and the dried strands are thereafter suitable to be combined with an elastomeric material as a reinforcement therefor. It has been found that the addition of the prehydrolized amino-functional silane coupling agent stabilized by the ammonia-soluble, carboxyl-containing polymers, to an aqueous coating composition including resorcinol-formaldehyde resin and vinylpyridine terpolymer latex yields a stable, aqueous composition with which the glass fibers may be sized with a coupling agent and coated with a rubber adhesive simultaneously in a single step process.

BRIEF DESCRIPTION OF THE DRAWINGS

These and other advantages and features of the invention and their means of accomplishment are further described in conjunction with a description of the drawings in which:

FIG. 2 is an enlarged view of the fiber forming and coating portion of the operation illustrated in FIG. 1, and FIG. 3 is a side view of FIG. 2 illustrating the arrangement of the glass fibers as they pass through the forming and coating portion of the operation illustrated in FIG. 1.

DESCRIPTION OF THE PREFERRED EMBODIMENT

Figure 1:
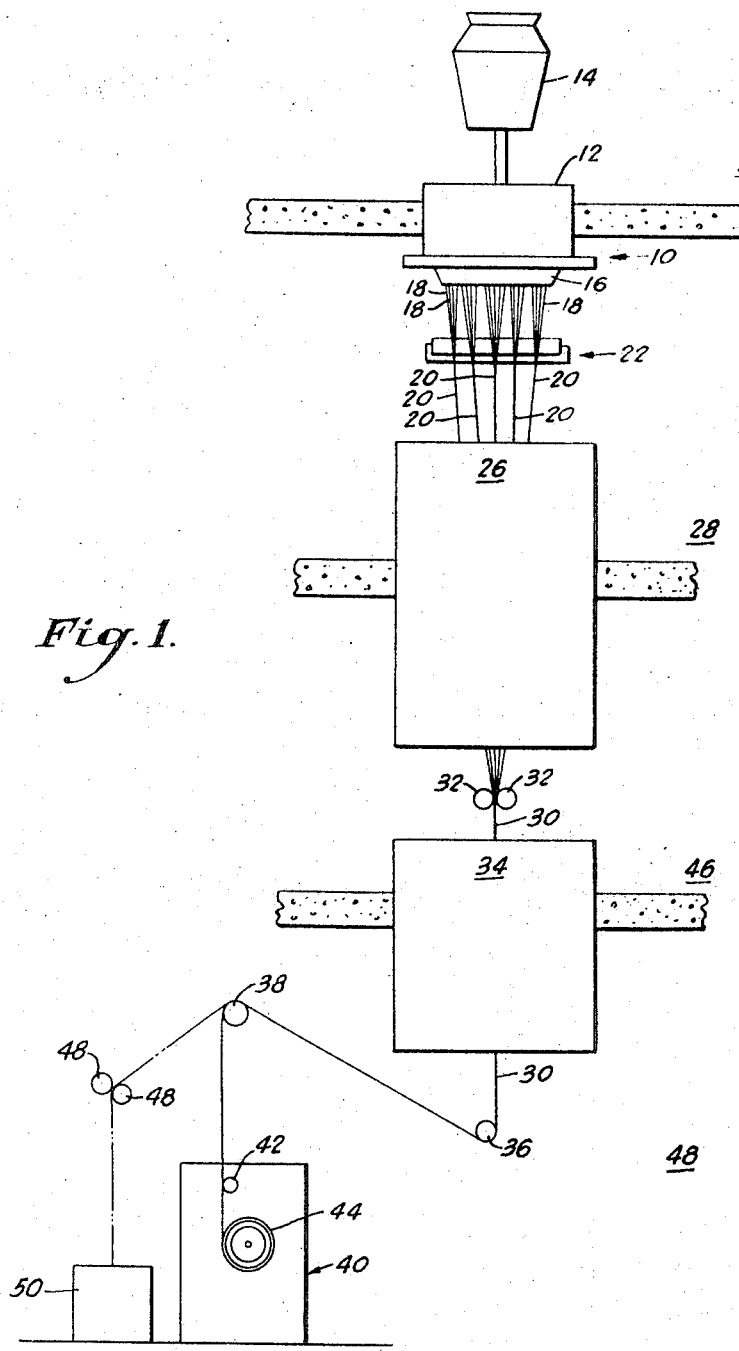
FIG. 1 is a diagrammatic view in elevation of a glass fiber strand forming, coating and drying operation.

Referring to the drawings and particularly to FIG. 1, there is illustrated diagrammatically fiber forming and coating apparatus with the fiber forming apparatus generally designated by the numeral 10. A premelter 12 in the fiber forming apparatus 10 is supplied with glass marbles from the supply hopper 14. Suitable controls are provided to automatically feed the glass marbles to the premelter 12 where they are melted and the molten glass flows through openings in a bushing 16 secured to the underside of the premelter 12. Glass fibers 18 are drawn or attenuated from cones of the molten glass suspended from tips in the openings in the bottom of the bushing 16. The bushing may, for example, have 40 pairs of rows with 25 tips in each pair of rows so that about 1,000 fibers can be simultaneously drawn from the tips in the bushing 16. For each of the 40 pairs of rows about 25 fibers are gathered and form about 40 groups or strands of fibers designated by the numeral 20. The spaced strands or groups 20 pass through drying ovens, as later described. Because the fibers 18 are drawn from the fiber forming apparatus, the hopper 14 and premelter are preferably located at the top level in the building designated in FIG. 1 by the numeral 24.

The separate fibers 18 pass over a conventional roller type coating applicator generally designated by the numeral 22 that is positioned adjacent to the bushing 16 and is arranged to coat the individual fibers 18 with the later described combined sizing and coating composition. The individual fibers 18 after being coated with the combined sizing and coating composition are gathered into groups or strands 20 containing about 25 glass fibers 18. The strands 20 of the coated fibers are thereafter drawn downwardly through a first heating zone or oven 26 which may be a dielectric oven. The groups or strands 20, while separated from each other as illustrated in the drawings, are dried in the first heating zone 26 to remove the water and volatilize the ammonia in the combined sizing and coating composition on the fibers 18. The groups or strands 20 of fibers 18 are spaced from each other approximately one-half inch as they are drawn into the oven 26. The strands 20 remain spaced from each other in the oven 26 while the strands are being dried. The strands 20, while being drawn through the oven 26 located at a second level 28 immediately below the top level 24, converge toward each other and are joined into a single or composite strand 30 as they pass over a pair of graphite gathering shoes 32.

The single composite strand 30 is then drawn through a second heating zone or oven 34 where additional heat is applied to the coated fibers to further cure the coating so that the combined strand 30 forms a roving. The combined strand or roving 30 passes over suitable guides 36 and 38 to a glass fiber strand forming winder 40 such as that illustrated in U.S. Pat. Nos. 3,041,662; 3,151,963 and 3,256,079. The forming winder 40 has a traverse 42 that forms a generally cylindrical package 44 on the winder 40 with an open wind.

Alternately, the separate strands 20 of fibers 18 can be joined into a combined strand or roving 30 after passing through the oven 26 without further curing of the coating or the cured, combined strand may be chopped into short discontinuous strands before the strand is wound on the forming winder 40.

As illustrated in FIG. 1, the lower portion of the oven 26, the graphite gathering shoes 32 and a portion of the second oven 34 are located at a still lower level 46. The demarcation between the various levels is indicated by the concrete floors. The lower portion of the oven 34 and the strand forming winder 40 are located at the lowest level 48. The strand travel direction may be changed from the vertical direction illustrated to a horizontal direction prior to entry into the second heating zone 34 to again reduce the height of the building required to house the strand forming and coating apparatus.

It is preferred that the combined strand 30 be pulled continuously during changing of the packages 44 on the winder 40 in order to avoid rethreading the separate strands 20 and combined strand 30 through the oven 26. Thus, pulling wheels 48 are provided on one side of the winder 40 and are employed to direct the combined strand or roving 30 into a waste container 50.

Referring to FIGS. 2 and 3, the upper portion of the fiber forming and coating apparatus is illustrated in enlarged form. In FIGS. 2 and 3, the individual fibers 18 are formed into small inverted pyramid-shaped groups, generally designated by the numeral 52 that contain between 10 and 50 fibers. In the groups, the fibers 18 are arranged in spaced side-by-side relation. The individual fibers 18 pass over a roller 54 of the roller type applicator 22. The roller 54 is suitably supported on a support member 56 that has a reservoir containing a supply of the combined sizing and coating composition. As the individual fibers are drawn over the surface of the roller 54, the fibers 19 tend to first move together in a ribbon and then fold over each other as they separate from the surface of the coated roller 54. A layer of the combined sizing and coating composition designated by the numeral 58 in FIG. 3, is picked up by the individual fibers 18 from the roller 54 and the combined sizing and coating composition tends to adhere to the fibers and the fibers 18 tend to hold together into unitary group or strand 20 that has an oval shape in cross section. The groups or strands 20 present a much greater surface area for drying the coated glass fibers 18 within the strands 20 in oven 26 than if the fibers 18 and strands 20 were consolidated into the composite strand 30 before drying. With this arrangement, the drying rate for the separate strands 20 proceeds at a faster rate in a smaller oven than the drying of a composite strand similar to the strand 30.

Throughout the specification and claims, the term combined sizing and coating composition is intended to refer to an aqueous mixture containing both coupling agent chemicals and rubber adhesive chemicals for coating a glass fiber for use in preparing glass fibers as a reinforcement in elastomeric materials.

By "rubber adhesive" chemicals is generally intended the combination of a conventional resorcinol-formaldehyde resin with a conventional polymeric rubber adhesive latex containing a polymer or terpolymer of vinylpyridine or the like. Examples of such latices comprise mixtures or copolymers in latex form of polyvinylpyridine with neoprene, isoprene, chloroprene, acrylonitrile-butadiene-styrene, butadiene-styrene copolymers and the like. U.S. Pat. No. 2,817,616 discloses suitable formulations of the "rubber adhesive" chemicals and is incorporated herein by reference.

Preferably there is employed a terpolymer latex of styrene-butadiene-vinylpyridine sold commercially by General Tire and Rubber Company under the trade name "GenTac," by Goodyear as "Pliolite VP-100," by Firestone as "FR-S220" and by Goodrich as "Goodrite 2518."

Amino-functional hydrolizable silane coupling agents useful in the invention are illustrated by the following general structural formula:

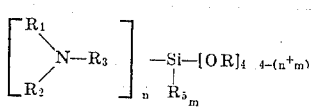

wherein $R_1$ may be $H$, an alkyl radical containing 1 to 5 carbon atoms or $H[NHCH_2-CH_2]_x-$, the $x$ being 1 to 5. $R_2$ may be H or an alkyl radical containing 1 to 5 carbon atoms. $R_3$ is a biradical selected from the group consisting of lower alkyl radicals having less than 8 and preferably less than 5 carbon atoms. $R_4$ and $R_5$ are alkyl radicals containing 1 to 5 carbon atoms, preferably 1 – 2 carbon atoms; $m$ is a whole number from 0 to 1, and $n$ is a whole number from 1 to 3, preferably 1. Typical examples include gamma-aminopropyltriethoxysilane and similar silanes produced in the manner shown in U.S. Pat. No. 2,832,754.

By ammonia-soluble carboxyl-containing polymers useful in the invention is intended those polymeric substances containing sufficient carboxylation for rendering them soluble in aqueous ammoniacal solutions, especially having a pH of about 01-10-Typical examples include ammonia-soluble carboxylated polyvinyl acetate, polystyrene, polyethylene and acrylic polymers and carboxylated elastomers such as carboxylated styrene-butadiene copolymers and styrene-butadiene-acrylonitrile polymers.

Typical useful ammonia-soluble carboxyl-containing polymers are acrylic interpolymers which contain from about 1 per cent to about 20 percent by weight of a hydroxyalkyl ester of acrylic acid, methacrylic acid or other alpha, beta-ethylenically unsaturated carboxylic acid. Such esters may be formed by esterifying an alkylene glycol with the acid or by reacting the acid with alkylene oxide. Interpolymerized with the hydroxyalkyl ester is from about 1 percent to about 20 percent by weight of an unsaturated carboxylic acid, and at least one other ethylenically unsaturated monomer copolymerizable with the acid and the ester.

The acrylic interpolymer may contain hydroxyalkyl esters, such as esters of acrylic acid and methacrylic acid in which the hydroxyalkyl group contains up to 5 carbon atoms (including 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 4-hydroxybutyl methacrylate and their mixtures). Esters of other unsaturated acids having up to about 6 carbon atoms, such as ethacrylic acid and crotonic acid, are also useful.

In addition to esters of unsaturated monocarboxylic acids, there may be employed mono- or diesters of unsaturated dicarboxylic acids, such as maleic acid, fumaric acid, and itaconic acid, in which at least one of the esterifying groups contains a hydroxyl group (including mono (2-hydroxyethyl) meleate, mono (2-hydroxyethyl) fumarate, bis (2-hydroxyethyl) maleate, mono (2-hydroxypropyl) maleate, bis (2-hydroxypropyl) maleate, mono (2-hydroxyethyl) itaconate, bis (2-hydroxyethyl) itaconate and 2-hydroxyethylbutyl maleate).

The remainder of the acrylic interpolymer is made up of one or more other ethylenically unsaturated monomers copolymerizable with the acid and ester. Typical monomers which may be used include: alkyl acrylates, alkyl methacrylates having up to about 20 carbon atoms in the alkyl group (including methyl, ethyl, propyl, butyl, hexyl, ethylhexyl and lauryl acrylates and methacrylates) and other alkyl esters of alpha, beta ethylenically unsaturated carboxylic acids. Vinyl aromatic hydrocarbons, such as styrene, alpha-alkyl styrene and vinyltoluene, may also be used in the interpolymer.

The interpolymers are prepared under conditions and using catalysts conventionally used in making acrylic polymers. A free radical catalyst is usually present and polymerization is typically carried out at a temperature between about 65° and 140°C.

The molecular weight of the carboxylated polymer can range up to about 20,000.

Although the formulations discussed herein are directed to a combined sizing and coating composition that may be applied as a single coating to the glass fibers, it should be understood that the composition may be used in conjunction with a direct coating plus an overcoat of rubber adhesive material applied to the strand either before winding on the package or applied as the coated strand is unwound from the package. Where desired, an overcoat of the combined sizing and coating composition may be similarly applied.

A suitable formulation for the combined sizing and coating composition may be prepared containing the following ranges of constituents.

| Constituents | % By Weight |
|---|---|
| Resorcinol-formaldehyde resin | 3 – 15 |
| Styrene-butadiene-vinyl-pyridine latex (41% solids by weight aqueous dispersion) (15:70:15 ratio) | 20 – 70 |
| Coupling agent | 0.01 – 3 |
| Ammonia soluble carboxyl-containing polymer | 0.1 – 6 |
| Ammonia (28% by weight solution) | 0.2 – 15 |
| Water | 60 – 85 |

The following three examples demonstrate the effectiveness of the instant discovery for stabilizing combined sizing and coating mixtures. Examples I through III are small scale tests. Example I shows the simple addition of sizing and coating mixtures:

EXAMPLE I

Three gallons of latex coating solution is prepared having the following composition:

3351 gm — Water
15 gm — Ammonia (28% NH$_4$OH)
492 gm — Resorcinol-formaldehyde novolak — acid catalyzed, 0.6 formaldehyde/resorcinol moleratio, 75 percent solids (e.g. Penacolite-Koppers Company)

The above constituents are mixed and added to:

5490 gm (15:70:15) Styrene-butadiene-vinyl pyridine, 41 percent solids (e.g. GenTac, General Rubber Company)

1830 gm — Styrene-butadiene rubber; 41% solids (e.g. Genflo, General Rubber Company)

The above mixture is mixed about 10 minutes and then the following added to it:

222 gm — formaldehyde (37 percent)

Approximately 3 gallons of latex coating or dip having a pH about 8.5 and a solids content about 30 percent results.

A sizing mixture containing a coupling agent having the following composition:

1 ml — gamma-aminopropyltri ethoxysilane
1 ml — ammonia (28% NH$_4$OH)
18 ml — Water is prepared by mixing.

The sizing mixture and coating mixture are combined by slowly adding 10 ml of the sizing mixture to 100 ml of the coating mixture. Immediate separation and lump formation is noted indicating incompatibility of the mixtures.

EXAMPLE II

A stabilizing mixture is prepared having the following composition:

31 ml — ammonia soluble carboxyl containing polymer (62% butyl acrylate, 22% styrene, 16% methacrylic acid) 80% solids in solvent of 43% butyl Cellosolve, 57% butanol; approximate viscosity — 75,000 cps.
30 ml — ammonia (28% NH$_4$OH)
10 ml — butyl Cellosolve
29 ml — water A sizing mixture is prepared having the following composition:

1 ml — gamma-aminopropyltriethoxysilane
2 ml — stabilizing mixture
1 ml — ammonia (28 percent NH$_4$OH)
16 ml — water The sizing mixture and a coating mixture as prepared in Example I are combined by slowly adding 10 ml of the sizing mixture to 100 ml of coating mixture. The mixture has a uniform texture with no evidence of lumps or instability.

EXAMPLE III

A stabilizing mixture is prepared having the following composition:

33 ml — ammonia soluble carboxyl containing polymer (49% butyl acrylate, 25% styrene, 16% methacrylic acid, 10% 2-hydroxyethyl acrylate) 75.5% solids in a solvent of 74% ethyl Cellosolve 18.5% n-butylether, 7.5% isopropyl alcohol; approximate viscosity 50,000 cps.
30 ml — ammonia (28% NH$_4$OH)
10 ml — butyl Cellosolve
27 ml — water A sizing mixture is prepared having the following composition:

1 ml — gamma-aminopropyltriethoxysilane
2 ml — stabilizing mixture
1 ml — ammonia (28 percent NH$_4$OH)
16 ml — water The sizing mixture and a coating mixture as prepared in Example I are combined by slowly adding 10 ml of the sizing mixture to 100 ml of coating mixture. The mixture has a uniform texture with no evidence of lumps or instability.

The following five examples illustrate suitable sizing and coating compositions according to the invention and the method of preparing those compositions. Examples of the combined sizing and coating compositions without the stabilizing carboxyl-containing polymer are also set forth to illustrate the problems encountered in mixing the combined sizing and coating compositions without the stabilizing agent. It is to be understood, however, that the examples of the combined sizing and coating composition are by way of illustration only and the invention is not intended to be limited to the specific formulation disclosed herein.

EXAMPLE IV

A resorcinol-formaldehyde resinous mixture is prepared in the following manner. To a vessel is charged 35 lbs. water, 16 grams potassium hydroxide and 1,440 grams resorcinol. The mixture is stirred to complete solution, after which there is added 2,000 grams of an aqueous solution of formaldehyde comprising 37 percent by weight formaldehyde. The mixture is aged for 3 hours at 75° – 78°F.

To a separate vessel is charged 77.5 lbs. GenTac synthetic rubber latex, a latex marketed by General Tire and Rubber Company comprising 41 percent by weight of styrene-butadiene-vinylpyridine terpolymer in the approximate ratio of 15:70:15. To the latex is charged with mild agitation, the resorcinol-formaldehyde resinous mixture prepared above. After the resorcinol-formaldehyde resinous mixture is completely charged, the mixture is stirred for 5 additional minutes after which is added 1,000 grams ammonia. The mixture is then covered and aged for from 16–20 hours with mild stirring.

To a third vessel is charged 2,400 grams water, 160 grams ammonia, and 160 grams of an ammonia-soluble acrylic resin manufactured and marketed as a 55 percent by weight aqueous mixture by Union Carbide and designated U. C. Acrylic LKSB 200. This is an ammonia soluble acrylic polymer or resin as described above. The mixture is stirred to solution, after which there is charged 160 grams of the coupling agent gamma-aminopropyltriethoxysilane. Stirring of the mixture is continued until a clear solution is formed. Thereafter, the clear solution containing the coupling agent stabilized with the acrylic resin according to the invention, is slowly added to the aged mixture prepared hereinabove with agitation and stirred for about 15 minutes.

It is noted that there was no "throwing out" or massive precipitation of the mixture's components when the coupling agent-containing mixture is added to the resin-rubber adhesive portion (i.e., the resorcinol-formaldehyde resin and vinylpyridine latex). Moreover, the mixture comprises 28 percent by weight solids, and glass fibers contacted with the mixture by means of a conventional roller applicator attain a satisfactory high coating weight.

EXAMPLE V

The method of Example IV is repeated with the exception that the 160 grams of the ammonia-soluble acrylic resin is omitted from the solution. The coupling agent is added to the third vessel and the mixture is stirred in the same manner as discussed in reference to Example IV. The solution from the third vessel containing the coupling agent without the acrylic resin stabilizer is added to the mixture of the latex and the resin. A lumpy, rubbery precipitate forms as the coupling agent solution is added to the latex resin mixture and the mixture with the precipitate therein is not suitable as a coating composition for the glass fibers.

Results similar to that discussed with reference to Example IV are obtained with other water dilutable acrylic resins such as the series of acrylic resins marketed under the trade name Staley A 700. Likewise, the acrylic resin may be replaced by the ammonium-soluble carboxylated polyvinyl acetates such as the commercial resin designated AIRCO ASB-516 (10–20 percent by weight crotonic acid) and the resin designated DARATAK 78L marketed by W. R. Grace and Company.

EXAMPLE VI

Another combined sizing and coating composition is prepared in accordance with the method of Example IV with the exception that a coupling agent designated Z–6050, marketed by Dow Corning Corporation, is substituted for the coupling agent gamma-aminopropyltriethoxysilane. Z–6050 is a partially condensed, or polymerized, hydrolizable aminoalkylsilane. Similar results to those of Example IV are obtained in that the latex does not precipitate when the stabilized coupling agent solution is added to the resin latex mixture. Likewise, similar results are obtained with other amino-functional hydrolizable silane coupling agents, such as that designated A-1120 (Union Carbide) having the structural formula:

$$NH_2CH_2CH_2NHCH_2CH_2CH_2Si(OCH_3)_3;$$

and that coupling agent having the structural formula:

EXAMPLE VII

A combined sizing and coating composition containing an excess of formaldehyde is prepared in the following manner. Amounts of the constituents are expressed as parts by weight. To a first vessel is charged 1,700 parts water, 155 parts of ammonium hydroxide. The ammonium hydroxide is of a standard concentration having about 28 percent ammonia. 388 parts of resorcinol-formaldehyde novolak is added to the solution. A suitable novolak is that sold by the Koppers Company, under the trade number R2170 and containing approximately 75 percent solids and 25 percent water. The mixture is stirred to complete solution.

In another vessel the latex is prepared by mixing 3,550 parts of GenTac synthetic rubber latex marketed by General Tire and Rubber Company and comprising 41 percent solids by weight of styrene-butadiene-vinylpyridine terpolymer in the approximate ratio of 15:70:15 and 1,183 parts of GenFlow, a synthetic rubber latex marketed by General Tire and Rubber Company, comprising 41 percent solids by weight of styrene and butadiene in the approximate ratio of 50:50. The resin solution from the first vessel is added to the latex and the mixture is mixed for about 10 minutes. To this mixture of resin and latex 268 parts of formaldehyde having a solids content of about 37 percent is added and the mixture is stirred and permitted to age overnight.

The coupling agent is prepared in a third vessel by adding 700 parts of water thereto and 40 parts of standard ammonium hydroxide solution. 40 parts of an ammonia-soluble acrylic resin manufactured and marketed as a 55 percent by weight aqueous mixture and designated by Union Carbide as U. C. 203 is added to the ammonium hydroxide and water. To the mixture 45 parts of a coupling agent designated A-1100, that is gamma-aminopropyltriethoxysilane is added to the vessel and the mixture is stirred until a clear solution is formed. The solution containing the coupling agent stabilized with the acrylic resin is thereafter slowly added to the aged mixture of the resin and latex with agitation and stirred for about 15 minutes.

Even with the excess formaldehyde in the resin-latex portion of the composition, there is no "throwing out" or precipitation of the latex when the stabilized coupling agent is added to the resin-latex mixture. The mixture comprises 30 percent by weight solids and the ratio of novolak to latex is about 15 parts by weight novolak to 100 parts by weight latex.

EXAMPLE VIII

The method of Example I is repeated and the resin and latex, having the same formulations, are prepared in separate vessels and thereafter, the resin is added to the latex and mixed for at least 10 minutes. Substantially the same amount of excess formaldehyde is added to the mixture and the resin-latex mixture is aged overnight. In a third vessel, the coupling agent is prepared in the same manner as in Example VII with the exception that the 40 parts of acrylic resin are omitted. As the coupling agent without the acrylic resin stabilizer is added to the resin-latex mixture, a massive precipitate of latex forms in the solution. The precipitate is a lumpy, rubbery mass and the combined sizing and coating composition with the precipitation is unsuitable for use in coating glass fibers.

The combined sizing and coating compositions of Examples I and IV are employed to size and coat about 1,000 E glass fibers, each having a diameter of between 0.00035 and 0.00040. The glass fibers are drawn from the bushing of apparatus illustrated in the drawings and coated by the roller applicator at relatively high speeds. There is a coating picked up of about 50 percent by weight on each strand 20 based on the weight of the fibers. The coated strands 20 are then drawn through an oven and substantially all the water and NH$_3$ of the combined sizing and coating composition is vaporized in the oven 26. The strands 20 are then joined into a combined strand 30 and sent through a second oven to partially cure the coating so that it is tack-free and capable of being wound into a cylindrical open wind forming package and unwound therefrom later for further processing into suitable form for desired rubber reinforcement. The dried coated strands 30 contain between 15 and 30 percent by weight of coating based on the weight of the strand.

The coated strands have a satisfactory H adhesion, flexural strength and compression fatigue resistance to glass fiber reinforced elastomeric products. The improved rubber reinforcement is achieved when either a cord or fabric produced from the combined strands or roving 30 prepared according to the process herein described and coated with the combined sizing and coating composition alone or over-coated with an additional coating of rubber adhesive. The cord or fabric so prepared is readily impregnated by the additional rubber adhesive and improved properties of strength are obtained therefrom. The elastomeric materials to which the coated strands can be satisfactorily added as a reinforcement include natural rubbers or rubbers formed synthetically of butadiene, chloroprene, isoprene and the like or copolymers of butadiene, chloroprene, isoprene with other materials well known in the manufacture of synthetic rubbers and especially the vulcanizable and curable modifications of the foregoing. The term elastomer or elastomeric material is intended, therefor to include natural and synthetic rubber in the uncured or unvulcanized state as in the cured or vulcanized state.

The invention has been described with respect to details of the preferred combined sizing and coating composition and the best mode of operation contemplated by the inventor. Other formulations of the combined sizing and coating compositions are contemplated which should be obvious in light of the previous description. It is to be understood that the invention is, therefore, not necessarily limited to the precise formulations and methods described herein.

I claim:

1. In the method of coating glass fibers for use in reinforcing elastomeric products comprising: attenuating glass fibers from cones of molten glass; applying to the fibers as they are being attenuated a combined aqueous size and coating composition comprising 3 to 15 percent by weight of a resorcinol-formaldehyde resin; 20 to 70 percent by weight of a styrene-butadiene-vinyl pyridine terpolymer latex; 0.01 to 3 percent by weight of an amino-functional silane coupling agent and ammonia the improvement which comprises: stabilizing said combined sizing and coating composition by the addition of 0.1 to 6 percent by weight of an ammonia soluble carboxyl containing polymer, said carboxyl containing polymer being carboxylated polyvinyl acetate, carboxylated styrene, carboxylated polyethylene, carboxylated elastomers, or carboxylated acrylic polymers.

2. The method of claim 1 wherein the fibers after coating are combined into a plurality of spaced apart strands and said spaced apart strands are dried and collected.

3. The combination of glass fibers and a combined sizing and coating composition on the surface of said glass fibers resulting from the drying on said fibers of a stabilized, aqueous sizing and coating composition comprising 3 to 15 percent by weight of resorcinol-formaldehyde resin, 20 to 70 percent by weight of styrene-butadiene-vinyl pyridine terpolymer latex; 0.01 to 3 percent of an amino-functional hydrolyzable silane coupling agent, ammonia and 0.1 to 6 percent by weight of an ammonia soluble carboxyl containing polymer, said carboxyl containing polymer being carboxylated polyvinyl acetate, carboxylated styrene, carboxylated polyethylene, carboxylated elastomers, or carboxylated acrylic polymers.

* * * * *